United States Patent
Bos et al.

(10) Patent No.: US 7,763,174 B2
(45) Date of Patent: Jul. 27, 2010

(54) PROCESS FOR REMOVING CONTAMINANTS USING REVERSE FLOW REACTOR WITH INTEGRATED SEPARATION

(75) Inventors: Alouisius Nicolaas Renée Bos, Amsterdam (NL); Girish Rajkumar Kabra, Amsterdam (NL); Jean-Paul Lange, Amsterdam (NL)

(73) Assignee: Shell Oil Company, Houston, TX (US)

( * ) Notice: Subject to any disclaimer, the term of this patent is extended or adjusted under 35 U.S.C. 154(b) by 634 days.

(21) Appl. No.: 11/666,074

(22) PCT Filed: Oct. 24, 2005

(86) PCT No.: PCT/EP2005/055483

§ 371 (c)(1),
(2), (4) Date: Apr. 23, 2007

(87) PCT Pub. No.: WO2006/045765

PCT Pub. Date: May 4, 2006

(65) Prior Publication Data

US 2009/0101584 A1   Apr. 23, 2009

(30) Foreign Application Priority Data

Oct. 25, 2004   (EP) .................................. 04105280

(51) Int. Cl.
*B01D 15/00* (2006.01)
*B01D 53/02* (2006.01)

(52) U.S. Cl. .................. 210/660; 210/689; 210/679; 210/763; 210/793; 210/678; 95/118; 95/119; 95/120; 95/131; 95/135

(58) Field of Classification Search ......... 210/670–679, 210/763, 660, 689, 793, 678; 95/117–121, 95/131, 132, 135–137
See application file for complete search history.

(56) References Cited

U.S. PATENT DOCUMENTS

| 3,898,049 A | 8/1975 | Burroughs et al. ........ 23/288 R |
| 4,478,808 A | 10/1984 | Matros et al. ............... 423/522 |
| 4,783,574 A * | 11/1988 | Barnes ....................... 585/738 |
| 5,366,708 A | 11/1994 | Matros et al. ............... 423/210 |
| 5,589,142 A | 12/1996 | Gribbon ...................... 422/171 |
| 5,753,197 A | 5/1998 | Chen et al. .................. 423/210 |
| 5,768,888 A * | 6/1998 | Matros et al. ................. 60/274 |

(Continued)

FOREIGN PATENT DOCUMENTS

| CA | 1165264 | 4/1984 |
| EP | 270177 | 6/1988 |
| EP | 582917 A1 * | 2/1994 |
| GB | 877089 | 9/1961 |

OTHER PUBLICATIONS

Yurii Sh. Matros, et al.: "Reverse-Flow Operation in Fixed Bed Catalytic Reactors", Cata. Rev.-Sci.Eng., 28(1), pp. 1-68, 1996.
G. Eigenberger, et al.: "Catalytic Combustion with Periodic Flow Reversal", Chemical Engineering Science, vol. 43, No. 8, pp. 2109-2115, 1998.

*Primary Examiner*—Chester T Barry

(57) ABSTRACT

The present invention pertains to a reverse-flow reactor comprising at least one catalyst bed which is preceded and followed by at least one bed containing selectively adsorbing material, and its application for in a process for the removal of contaminants from a process stream.

14 Claims, 1 Drawing Sheet

U.S. PATENT DOCUMENTS

| | | | |
|---|---|---|---|
| 6,118,036 A * | 9/2000 | Zinnen | 585/738 |
| 6,214,758 B1 * | 4/2001 | Wu et al. | 502/64 |
| 6,261,093 B1 | 7/2001 | Matros et al. | 432/181 |
| 6,314,722 B1 * | 11/2001 | Matros et al. | 60/274 |
| 6,624,115 B2 * | 9/2003 | Schuh et al. | 502/439 |
| 2006/0059899 A1 * | 3/2006 | Bailey | 60/296 |

* cited by examiner

PROCESS FOR REMOVING CONTAMINANTS USING REVERSE FLOW REACTOR WITH INTEGRATED SEPARATION

The present application claims priority from European Patent Application No. 04105280.4 filed 25 Oct. 2004.

FIELD OF THE INVENTION

The present invention pertains to a reverse-flow reactor, and a process for employing such a reactor.

BACKGROUND OF THE INVENTION

Reverse-flow reactors are well known in the art. The general principle of such reactors has been described in detail in "Reverse-Flow Operation in Fixed Bed Catalytic Reactors", Cata. Rev.-Sci. Eng., 28(1), 1-68 (1996).

Reverse-flow reactors have been employed in a number of different large-scale heterogeneous processes, such as catalytic incineration of volatile organic contaminants, the hydrogen sulphide oxidation by sulphur dioxide, Fischer-Tropsch synthesis over ruthenium and cobalt catalysts, the selective reduction of carbon monoxide and/or nitric oxides in flue gases, and similar processes, as described in U.S. Pat. No. 6,261,093, CAN-A-1,165,264, U.S. Pat. No. 5,753,197, U.S. Pat. No. 5,589,142.

A simple reverse-flow reactor for catalytic reactions on a fixed catalyst bed consists of a reactor vessel comprising at least one catalyst bed and optionally, one or more beds of refractory packings, often referred to as inerts to hold the catalyst bed in place which also may provide for additional heat capacity, and the necessary line-up and switching valves that allow to oscillate the flow direction of a fluid or gaseous reaction medium between the respective reactor in- or outlet.

A disadvantage of all fixed bed reactors, and hence also of reverse-flow reactors is that contaminants present in the reaction medium may deactivate or reduce the selectivity of the catalyst, and thus require replacement or reactivation of the catalyst. Due to the complex structure of a reverse-flow reactor set-up, such reactivation or replacement is particularly cumbersome. Alternatively, the contaminants need to be removed from the reactor feeds before feeding into the reverse-flow reactor, which requires an additional separate removal step involving costs for operation and investment.

The subject invention has the advantage to avoid the deactivation of the catalysts without the requirement for a separate removal step.

This has been achieved by placing at least one bed of a selectively adsorbing material before each side of the catalyst bed.

SUMMARY OF THE INVENTION

Accordingly, the present invention pertains to a reverse-flow reactor comprising at least one catalyst bed, which is preceded and followed by at least one bed comprising selectively adsorbent material. The present invention also comprises a process for the removal of contaminants from a feed process stream in a reverse-flow reactor containing at least one catalyst bed, said process comprising the steps of (a) removing a contaminant from the process stream prior to its entering the at least one catalyst bed by adsorption to a selectively adsorbing material;

(b) reversing the process stream flow direction before the contaminant front reaches the at least one catalyst bed; and (c) removing the adsorbed contaminant from the selectively adsorbing material by thermal desorption into the stream that leaves the at least one catalyst bed.

DETAILED DESCRIPTION OF THE INVENTION

Figure 1:
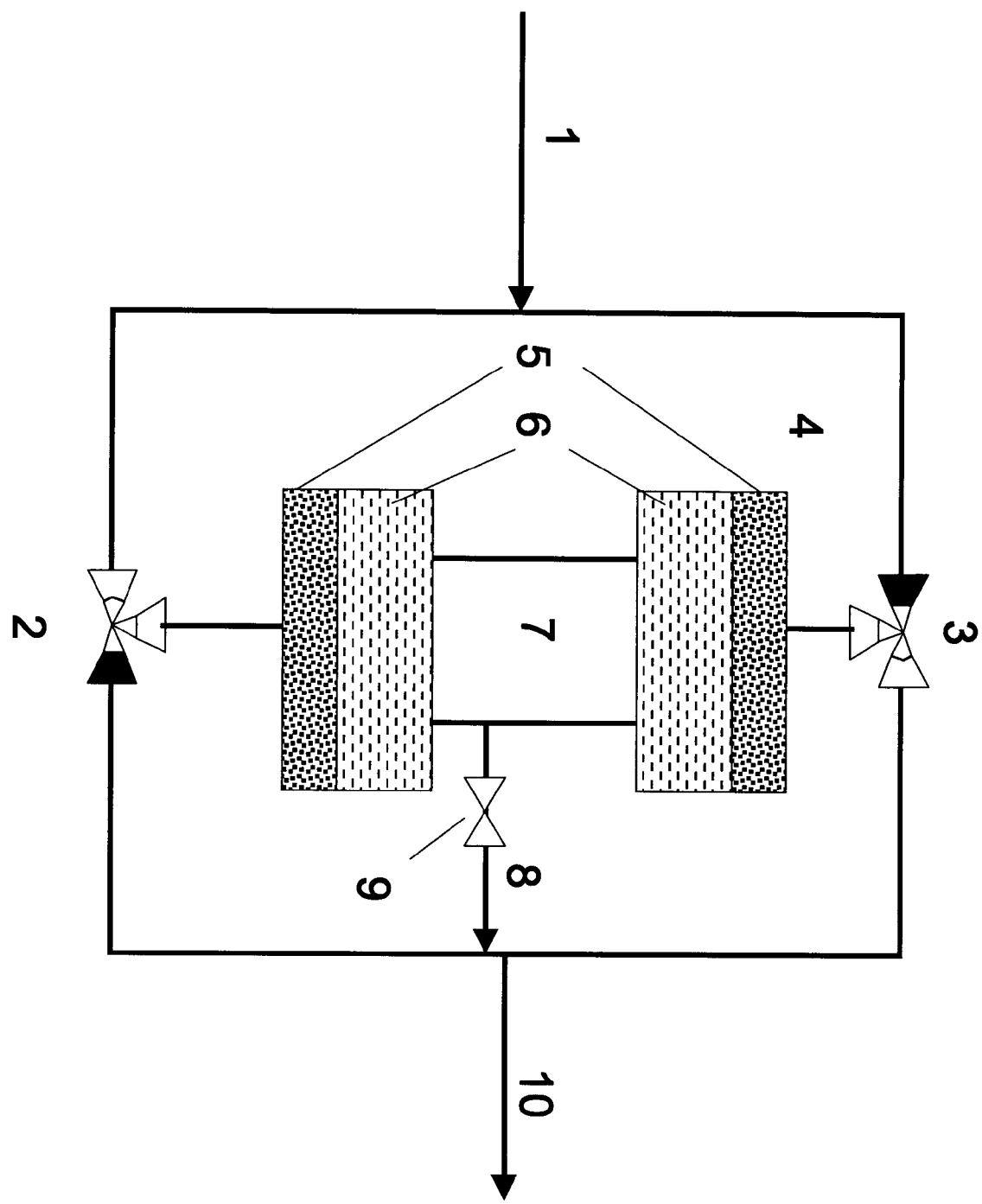
FIG. 1 illustrates an embodiment of the reverse flow reactor.

The principle of reverse flow reactor consists in that in a fixed bed reactor, the flow direction of reaction medium is periodically reversed to retain the heat of reaction within the fixed bed before a travelling heat front that develops in the reactor reaches the reactor outlet. The heat front then travels in the opposite direction in the reactor until the next reversal of the flow direction. As a result, a reverse flow reactor operates as a regenerative heat exchanger/reactor system with relatively cool inlet and outlet temperatures, and high temperatures in the catalytic middle section. This allows using the reactor middle section both as an active catalyst bed as well as a heat exchange and heating accumulation medium or heat sink, which is able to collect and transfer the stored energy of the reaction to the cooler inlet gas. Such a reactor system makes it possible to provide continuous auto-thermal operation without external feed preheating in advance of the catalyst bed, and by thus providing an increased catalyst bed heat capacity as compared to steady-state processes in adiabatic reactors. As in conventional fixed bed reactors, the contaminants present in the reaction medium may deactivate or reduce the selectivity of the catalyst. In the reactor design according to subject invention, a bed or layer comprising adsorbent material capable of selectively adsorbing the contaminants while allowing the other reactants in the reactor medium to pass through is placed upstream and downstream of the catalyst bed or beds to adsorb the undesired contaminants. In a conventional fixed bed reactor under continuous conditions, the contaminant front would eventually reach the catalyst bed upon saturation of the adsorbent bed, which would thus only delay the eventual deactivation or poisoning of the catalyst bed.

It has now been found that by placing adsorbent beds on both sides of the catalyst bed according to invention, the adsorbed contaminants are in effect by-passed over the catalyst bed, thereby enhancing the catalytic performance and the active lifetime of the catalyst. Without wishing to be bound to any particular theory, it is believed that the contaminants are only selectively adsorbed in the first half of the operation cycle, whereas in the second half of the cycle, when the flow direction is reversed, the adsorbate is desorbed from the adsorption layer into the effluent of the reactor. This adsorption/desorption process is facilitated by the inherent differences in local temperatures prevailing during the first and during the second half of the reverse flow reactor operation. In this way, the adsorbed contaminants are in effect by-passed over the catalyst bed.

FIG. 1 illustrates a preferred embodiment of the present reverse-flow reactor: This reverse-flow reactor comprises a reactor unit (4), wherein a catalyst bed (6) is provided, preceded and followed by a bed containing selectively adsorbing material (5). The catalyst bed (6) comprises an intermediate space (7) provided with means for intermediate heat or reaction medium removal. A by-pass (8) with optional valve (9) is connected with the intermediate space. A feed inlet (1) is connected to a pipe circuit connected to two three way-valves (2) and (3), respectively. These in turn are connected to the reactor unit, and to a second pipe circuit connected to a feed outlet (10). In operation, a feed stream enters the reverse-flow reactor set-up through inlet (1), and then is distributed via a three-way valve (2) to the reactor unit. In this reactor unit, the feed stream passes through the first bed (5) of selectively adsorbing material, and then through the catalyst bed (6) and again through an adsorbent bed (5) before exiting the reactor unit through valve (3) and outlet (10). The adsorbent material in bed (5) will retain the compounds that are selectively adsorbed from the feed stream. Before the front of the selectively adsorbed material reaches the catalyst bed 6, the flow of the reverse reactor is reversed by switching valves 2 and 3 to the opposite direction and the material is desorbed with the gas stream exiting the reactor, and leaves the reactor unit via the outlet (7), thereby effectively by-passing the catalyst bed. At the same time, the opposite adsorbent bed (5) will adsorb the contaminant from the feed stream flowing in the opposite flow direction, until the front of the adsorbed material reaches the catalyst bed (6), prior to which the flow direction is reversed again.

Preferably, the adsorbent beds may be introduced into the reactor by replacing part of the inert bed and/or the catalyst bed in the reactor by suitable adsorbents. As adsorption and desorption depend on vapour pressures and temperature gradient, this process is particularly effective for exothermic reactions taking place in the catalyst bed. In performing exothermic reactions, the effluent from the reactor has a higher temperature downstream the catalyst bed than the reactor feed at the inlet, which favours desorption at the outlet and adsorption at the inlet.

In endothermic reactions, in order to achieve a suitably fast and effective desorption, additional heating of the catalyst bed or the effluent might be required in order to provide the temperature differential, for instance by steam, or an internal heat exchanger, or by applying simultaneously an exothermic reaction in the catalyst bed. The temperature of the effluent preferably is at least 20° C. higher than the temperature of the feed at the inlet.

Vapour pressures and solubility in the effluent are in both cases enhanced, as the effluent stream downstream the catalyst bed and adsorbent bed contains a lower concentration of the contaminants than the feed stream, since the first adsorbent bed has adsorbed all or most of the contaminants from the feed stream prior to the catalyst bed.

Selectively adsorbing material according to the subject invention can be conveniently selected by the skilled person from materials that allow reversible desorption of the adsorbed compounds under reversed flow under the temperature and/or pressure difference given by the process that is performed in the reverse-flow reactor. Large temperature gradients are usually reported in reverse flow reactors. This gives additional flexibility with respect to selecting suitable adsorbents, since the adsorption and desorption characteristics of adsorbents can be met by placing the adsorbent at an appropriate place in the reactor providing the adsorbent with the most suitable conditions.

Preferred adsorbents materials include silica, alumina, zeolites and clays, meso- and microporous mixed oxides as well as meso- and microporous inorganic and organic solids like diatomaceous earth and active carbon such as charcoal, porous and non-porous polymer beads. Other preferred adsorbent materials include ion exchange resins, including macro-reticular, and/or gel-type resins. Yet more preferred inorganic adsorbents such as silica, alumina, zeolites, and clays due to the high surface area while allowing high flow. Zeolite adsorbents of Zeolite types A, X Y and MFI allowed for instance water and other polar components to be selectively adsorbed and desorbed from a flow of vent gas while allowing the hydrocarbons in the feed to pass through, and generally are expected to have the same effect on other highly polar molecules, as described in "Römmps Chemie-Lexicon", Volume 1, p. 73 to 74, $8^{th}$ Edition, 1979. Accordingly, for the removal of water from the reaction medium, the selectively adsorbing material preferably is a hydrophilic material, yet more preferably a Zeolite of type A, X and Y, most preferred being Zeolite X. The selective adsorbents preferably have a surface area of at least 20 $m^2/g$, yet more preferably they have a surface area of at least 200 $m^2/g$, and again more preferably they have a surface area of at least 1000 $m^2/g$. Beds of inerts that are usually placed before the catalyst bed(s) in conventional reverse-flow reactors are not considered selective adsorbent layers or beds according to the subject invention, as the adsorption on such materials is very limited due to the low surface area. However, the adsorbent beds may further preferably comprise inert materials, yet more preferably ceramic materials such as refractory materials in order to increase the physical strength of the adsorbents and in order to avoid migration of small particles into the catalyst bed. Suitable adsorbent materials may be in the form of shaped particles, such as for instance extrudates or pellets in any suitable shape such as rings, spheres, cylinders or trilobes. Suitable shapes also include monolithic structures, such as honeycomb and foam structures. The dimension and adsorption capacity required for the beds of adsorbents according to the invention may vary widely, and depend on the specific feed and contaminants to be adsorbed and desorbed under relevant temperature and flow conditions. Preferably, the selectively adsorbing material is a hydrophilic material where water or other polar components are to be removed from the reactor feed.

In a preferred embodiment of the subject invention, the reverse-flow reactor comprises at least two separate catalyst beds, and a space in between the catalyst beds for intermediate heat input or heat and reaction medium removal. This allows controlling the reactor temperature, heat integration of the reaction, as well as removal of part of the reaction medium, or addition of additional components to the catalytic zone of the reactor.

The use of reverse-flow reactors for the removal of volatile organic compounds (VOC's), such as methane, ethane, solvents and other contaminants stemming from a number of processes has been described for example in "Catalytic combustion with periodic flow reversal", Eigenberger, G., Nieken, U., Chem. Eng. Sci., 43, 2109-2115, 1988. In this process usually noble metal catalysts are applied. It was found that a number of these noble metal catalysts are negatively affected by the presence of water (i.e. the humidity of the gas stream), which was found detrimental to the catalyst activity and to the physical stability of catalysts. Removal of the water by use of adsorbent beds in a reverse-flow reactor according to the invention resulted in an increased selectivity for the conversion of methane and increased overall stability of the catalyst was found when using a reactor according to the invention as described herein-above, without the need for a separate water removal step.

Accordingly, the subject invention also preferably relates to a reverse-flow reactor comprising a catalyst bed, wherein the catalyst comprises compounds or metals selected from the groups 8, 9, or 10 of the Periodic Table. According to the present IUPAC notation, group 8, 9 and 10 metals are Fe, Ru, Os; Co, Rh, Ir and Ni, Pd, and Pt, respectively, as described in the CRC Handbook of Chemistry and Physics, 72$^{nd}$ Edition, 1991-1992. Yet more preferred are catalyst beds comprising catalysts based on one or more of metals or compounds of Pd, Pt or Ni due to the effectiveness of these catalysts.

The subject invention also relates to a process for the removal of contaminants from a process stream, including liquid and gaseous process streams, in a reverse-flow reactor comprising a bed or layer of adsorbent material before and after the catalyst bed, which process comprises the steps of (a) removing a contaminant from the process stream prior to its entering the catalyst bed or beds by adsorption to the selectively adsorbing material, and (b) reversing the process stream flow direction before the contaminant front reaches the catalyst bed, and (c) removing the adsorbed contaminant from the selectively adsorbing material by thermal desorption into the process stream that leaves the catalyst bed.

In a preferred embodiment of the present process, water is removed from a gaseous process stream, such as for instance a vent gas stream. The vent gas stream may contain any amount of water and/or volatile organic compounds. Other preferred embodiments include the removal of halogen-containing and/or sulphur-containing contaminants from process streams. The reactor and process according to the present invention are further illustrated by the following examples.

Experimental Part

The following examples were performed in a tubular reverse-Flow Reactor set-up as described in CAN-A-1,165,264 using argon as carrier gas, and were performed to show whether an undesired compound, such as water, could be effectively adsorbed and desorbed, allowing by-passing over a catalyst bed.

An adsorbent bed heated to 80° C. was subjected for a period of time to an argon stream containing 6% by weight of water (simulating a wet reactor feed) and subsequently subjected to a dry argon stream in the reverse flow direction while the temperature in the bed was raised to 160° C., thereby simulating the outgoing stream from the catalyst bed in an exothermic reaction in reverse flow mode. The flow of wet and dry feed and the temperature of the bed were switched every 10 minutes. For the wet feed stream, water was dosed by means of passing a stream of Argon gas through water having a temperature of 80° C., followed by cooling the stream prior to the reactor.

Comparative Example 1

In the reverse-flow reactor, first a wet argon stream as described above was passed over a bed of commercially available silica pellets (used as silica carrier for heterogeneous catalyst) placed in the reactor tube at an hourly space velocity of 18.000 (ml/g×h), followed by a reversed dry argon stream as described above, alternating every 10 minutes. After 30 minutes of equilibration operation, water concentration was measured at the outlet over time. The bed of refractory silica pellets did not exhibit a marked adsorption capacity as compared to an empty reactor tube, and the concentration of water at the outlet side reached 6% within a period of less than 1 minute. The efficiency of water adsorption (expressed as % water in effluent/% water in feed×100%) was measured after 10 minutes of operation under wet argon stream, prior to the switch to the hot dry argon stream. Accordingly, the efficiency of the silica carrier bed for water adsorption was 0%.

EXAMPLES 1 AND 2

Comparative Example 1 was repeated, however replacing the silica pellet bed by a bed of commercially available pellets of adsorbents A and B (see Table 1). Amounts of water vapour present in the feed and effluent gas stream were measured. Both adsorbent beds showed that water concentration after the adsorbent bed only increased very slowly, while under desorption conditions (reversed dry argon flow), the water was desorbed and released quickly. The adsorbents A and B and the results obtained are listed in Table 1:

TABLE 1

| Efficiency of water adsorption | | |
|---|---|---|
| Adsorbent | Material | Efficiency of water adsorption |
| Comparative Silica carrier | 1.3 mm extrudates | 0% |
| A | Zeolite A (ZEOCHEM Z4-01 spheres 1.6-2.7 mm) | 33% |
| B | Zeolite X (Zeolyst (PQ) 13X spheres 1.0-2.0 mm) | 85% |

The experiments illustrate the effect of placing adsorbent beds before and after a catalyst in a reverse-flow reactor. This allows to effectively by-pass undesired contaminants such as water present in the feed over the catalyst bed, without the need to remove such contaminants prior to the reactor.

What is claimed is:

1. A process for the removal of contaminants from a feed process stream in a reverse-flow reactor containing at least one catalyst bed and at least two beds containing selectively adsorbing material wherein the feed flows through a first bed containing selectively adsorbing material into the at least one catalyst bed and then through a second bed containing selectively adsorbing material, said process comprising the steps of
   (a) removing a contaminant from the process stream prior to its entering the at least one catalyst bed by adsorption in said first bed containing a selectively adsorbing material;
   (b) causing the feed from which a contaminant has been removed to flow through the at least one catalyst bed and then through said second bed containing a selectively adsorbing material;
   (c) reversing the process stream flow direction before the contaminant front reaches the at least one catalyst bed; and
   (d) removing the adsorbed contaminant from the selectively adsorbing material by thermal desorption into the stream that leaves the at least one catalyst bed.

2. The process of claim 1, wherein water is removed as contaminant from a gaseous process stream.

3. The process of claim 2, wherein the selectively adsorbing material is a Zeolite absorbent of Zeolite type A or X.

4. The process of claim 1, wherein halogen-containing and/or sulphur-containing contaminants are removed from a liquid or gaseous process stream.

5. The process of claim 1, wherein the selectively absorbing material is selected from the group consisting of silica, alumina, zeolites, clays and active carbon.

6. The process of claim 1, wherein the selectively adsorbing material is a hydrophilic material.

7. The process of claim 1, wherein the catalyst is an oxidation catalyst comprising one or more metals or metal compounds selected from groups 8, 9 or 10 of the Periodic Table of Elements.

8. The process of claim 1, wherein the temperature of the stream that leaves the at least one catalyst bed is at least 20° C. higher than the temperature of the feed process stream.

9. The process of claim 1, wherein at least two catalyst beds are used and there is a space in between the beds for intermediate heat input or heat removal.

10. A process for the removal of water from a feed process stream in a reverse-flow reactor containing at least one catalyst bed, said process comprising the steps of
    (a) removing water from the process stream prior to its entering the at least one catalyst bed by adsorption to a selectively adsorbing material;
    (b) reversing the process stream flow direction before the contaminant front reaches the at least one catalyst bed; and
    (c) removing the water from the selectively adsorbing material by thermal desorption into the stream that leaves the at least one catalyst bed.

11. The process of claim 10, wherein the selectively adsorbing material is a zeolite absorbent of zeolite type A or X.

12. The process of claim 10, wherein the selectively adsorbing material is a hydrophilic material.

13. The process of claim 10, wherein at least two catalyst beds are used and there is a space in between the beds for intermediate heat input or heat removal.

14. The process of claim 1 wherein the bed containing selectively adsorbing material also contains inert material.

* * * * *